Feb. 22, 1949. L. J. NOWAK, JR 2,462,216
HYDRAULIC BALANCE
Filed Dec. 30, 1944 2 Sheets-Sheet 1
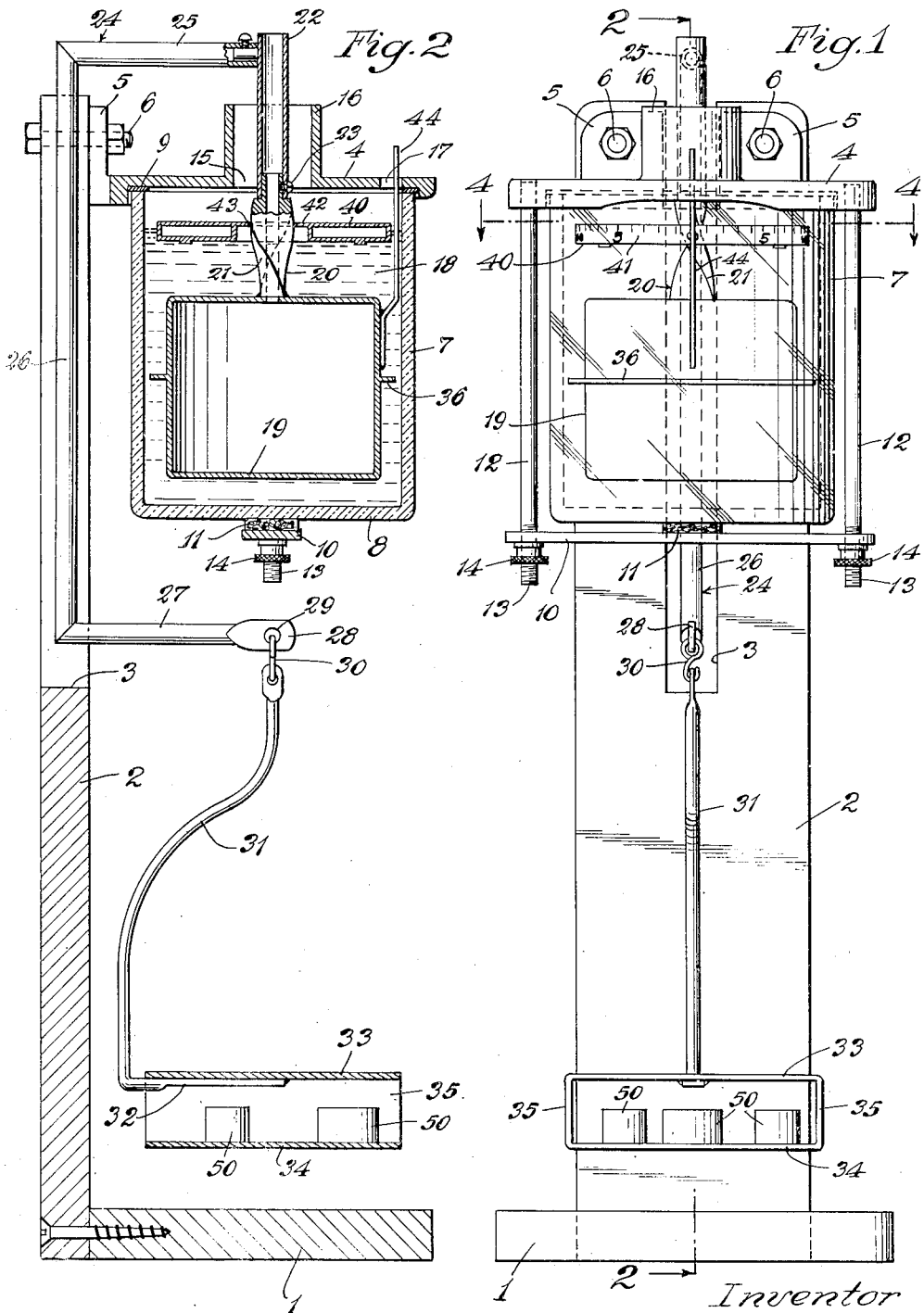
Inventor
Leon J. Nowak, Jr.
by Parker & Carter
Attorneys Feb. 22, 1949. L. J. NOWAK, JR 2,462,216
HYDRAULIC BALANCE
Filed Dec. 30, 1944 2 Sheets-Sheet 2
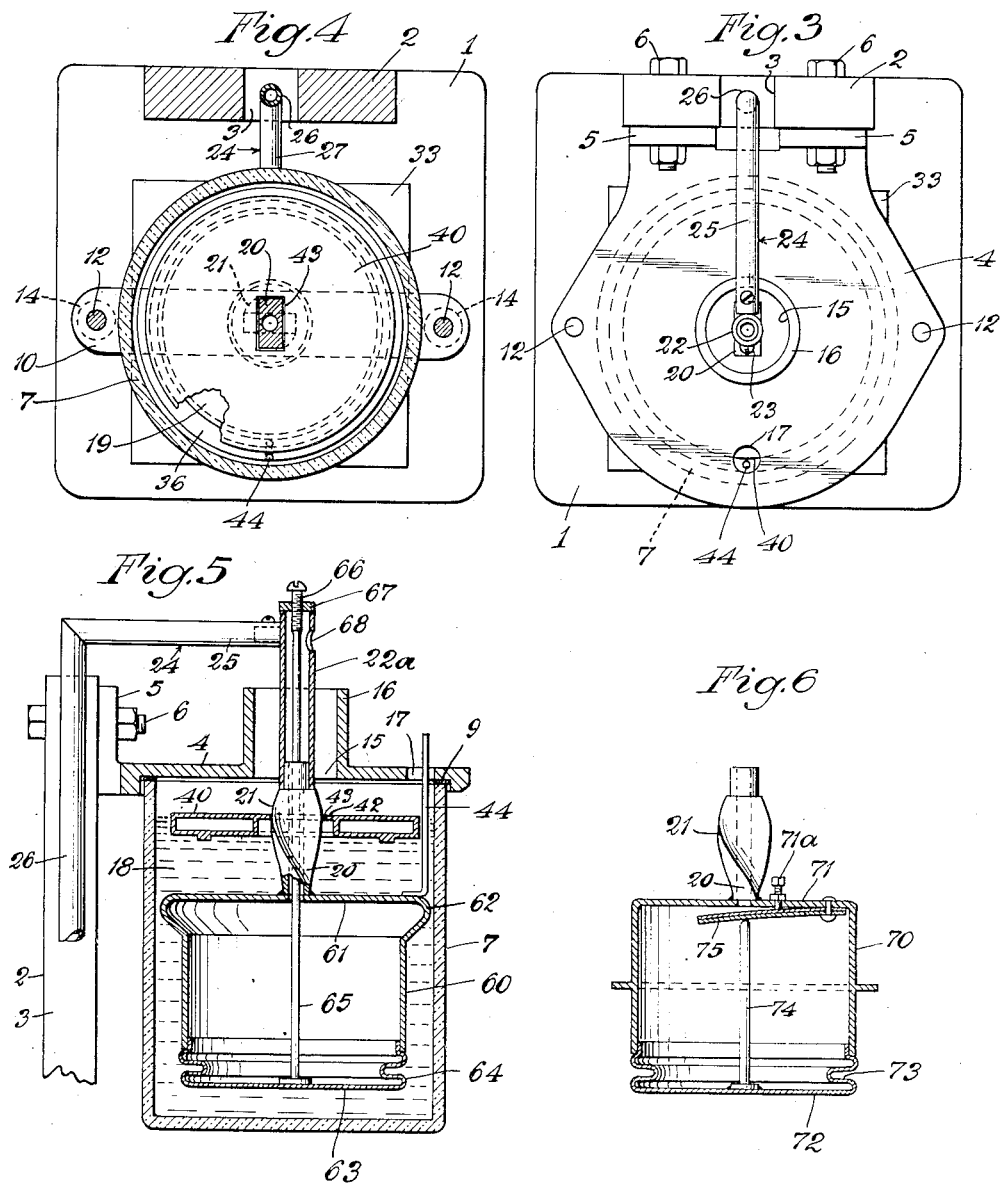
Inventor
Leon J. Nowak, Jr.
by Parker & Carter
Attorneys.

Patented Feb. 22, 1949

2,462,216

UNITED STATES PATENT OFFICE 2,462,216

HYDRAULIC BALANCE

Leon J. Nowak, Jr., Chicago, Ill.

Application December 30, 1944, Serial No. 570,641

6 Claims. (Cl. 265—43)

My invention relates to an improvement in scales or balances and has for one purpose to provide a scale or balance of maximum accuracy.

Another purpose is to provide scales or a weighing structure in which friction shall be substantially eliminated.

Another purpose is to provide scales employing a float or a plurality of floats as a weighing device.

Another purpose is to provide hydraulic scales, the accuracy of which shall not be perceptibly affected by temperature changes.

Another purpose is to provide scales which shall be of maximum sensitivity.

Another purpose is to provide scales in which the time lag of the weighing operation shall be reduced to a minimum.

Other purposes will appear from time to time in the course of the specification and claims.

My invention is illustrated more or less diagrammatically in the accompanying drawings, wherein—

Figure 1 is a front elevation;

Figure 2 is a section on the line 2—2 of Figure 1;

Figure 3 is a top plan view;

Figure 4 is a section on the line 4—4 of Figure 1;

Figure 5 is a partial vertical section illustrating a variant form; and

Figure 6 is a partial vertical section through a variant form.

Like parts are indicated by like symbols throughout the specification and drawings.

Referring to the drawings, 1 generally indicates any suitable base having an upwardly extending frame member 2 which is vertically slotted as at 3. At the top of the frame member 2 is a plate 4 with lugs 5 secured by bolts 6 to the frame member 2 at opposite sides of the slot 3. If desired, the entire structure may be made of one unitary piece of metal, plastic or the like. 7 is a transparent container, of glass, plastic, or any suitable material, with a closed bottom 8 and an open top. The container may be held in position against a gasket 9 on the lower face of the plate 4, by a cross bar 10 with its compressible packing 11. The end of the cross bar may be secured by rods 12 extending downwardly from the plate 4 through the cross bar, the lower end of the rods being screw threaded at 13 to receive thumb nuts 14 or other suitable securing means. The plate 4 is generally centrally apertured as at 15, the aperture being upwardly continued by an open topped sleeve 16. The plate is also apertured as at 17.

18 indicates a body of any suitable liquid in the container 7. Normally submerged in the liquid is a float 19 with an upwardly extending stem 20 having an outer spiral cam face 21. The hollow stem 20 is upwardly continued by a hollow tube 22 secured to the stem 20 by the securing screw 23. It will be understood that the portions 20 and 22 may be integrally formed if desired. The interior of the float 19 is in communication with the atmosphere through the stem 20 and tube 22, in the form of the invention herein shown. However, if desired, the float may be sealed from the atmosphere and air or any other suitable gas or light fluid may be employed to give it buoyancy. Or a solid float of light material may under some circumstances be employed.

24 generally indicates a yoke having an upper horizontal arm 25, an intermediate vertical arm 26 and a bottom arm 27 terminating in a flattened portion 28. The portion 28 is apertured as at 29 to receive any suitable link or connecting member 30 for flexibly supporting the bent member 31 to the lower end 32 of which is secured a weighing platform. In the form herein shown the weighing platform includes an upper floor 33, a lower floor 34 and connecting vertical side walls 35. The walls and floors define a space in which removable weights may be positioned, as shown at 50. The vertical yoke arm 26 extends into the slot 3. The upper horizontal yoke arm 25 is secured to the upper end of the hollow stem 22.

The weight of the weighing platform, including the connections between it and the float, is so related to the buoyancy of the float 19, that the float is constantly submerged in the liquid 18. Rapid vertical movement of the float 19 in the liquid 18 is prevented by the circumferentially extending flange 36 which, with the liquid in the container 7 performs a dash pot function.

A second float 40, which may be described as an indicating float, floats freely at the surface of the liquid. I illustrate it as having an outer and generally cylindrical face calibrated as at 41. In the form herein shown I illustrate the float 40 as having a central plate or portion 42 which is apertured as at 43 to conform loosely to the spiral 21 of the stem 20. Thus upward or downward movement of the float 19 will cause a rotation of the float 40. Any substantial rotation of the float 19 will be prevented by the walls of the slot 3, cooperating with the vertical portion of the yoke arm, 26. 44 is a pointer on the float 19, which extends upwardly across the calibrated face 41 of the float 40, and may extend upwardly through the aperture 17 of the plate 4.

Referring to the form of Figure 5, I illustrate a variant form of float including the generally cylindrical side walls 60, the top wall 61, the circumferential enlargement 62, the bottom wall 63 and the bellows 64. 65 is an adjusting rod extending upwardly through the sleeve 22a and having a screw threaded portion 66 which passes through any suitable top plate 67. 68 is any suitable vent in the sleeve 22a. I thus provide means for adjusting the cubic content of the float to compensate for temperature variations or tare weight.

Referring to Figure 6, I illustrate another float which includes the cylindrical side wall 70, the top wall 71, the bottom wall 72 and the bellows 73. 74 is a pin upwardly extending from the bellows and abutting against a bi-metal strip or warping bar 75. The warping bar, which varies its position or flexure in response to changes in temperature, thus serves as means for automatically varying the cubic content of the float in response to changes in the temperature to which the float is exposed. I may also provide an adjusting screw 71a to adjust for tare weight.

The use and operation of my invention are as follows:

I provide a very sensitive hydraulic balance in which the use of bearings is avoided. The system includes a normally submerged float 19 which is directly connected to a weighing platform 33. The relation between the gravitational downward pull of the weighing platform and of the parts which connect the weighing platform to the float are so related to the buoyancy of the float that the float is maintained constantly submerged at a predetermined level. I may find it desirable to provide means, such as the removable weights 50, for controllably loading the float system and for maintaining the float 19, or the corresponding floats in Figures 5 and 6 at a predetermined level within the liquid 18. A convenient method of operating my scale is to provide a series of weights 50 of varying sizes. These are used to maintain the system normally balanced to maintain a predetermined relationship between the float 19 and the level of the liquid 18, or to maintain a predetermined position of the pointer 44 in relation to the calibration 41 on the float 40. When an article is to be weighed, it is applied to the platform 33 and the appropriate number and size of weights 50 are removed, until the system is again at or near its predetermined relationship or balance. If the system is not in balance, the float 40, within its capacity or range, will indicate the deviation from the predetermined or desired balance.

One advantage of my balance rests in the fact that no bearings are employed and frictional resistance may therefore be substantially disregarded. Another advantage arises from the fact that the float is submerged and that the part of the float system which extends through the surface of the liquid is of restricted diameter. The smaller the area of contact between the surface of the liquid and the connection between the submerged float and the weighing platform, the more delicate, sensitive and accurate will be the balance in operation. What slight friction there may be between the rod 26 and the sides of the slot 3 is so slight as to be negligible.

I may use a variety of liquids but I find it advantageous to employ a liquid with low surface tension and a long evaporation period. It is also advantageous to employ a liquid which is non freezing to a substantially low temperature, if the balance is to be used out of doors or in a cold room. The liquid should also be clear or transparent to permit a ready reading of the calibration 41. Any suitable wetting agent may be employed to reduce the surface tension of the liquid and to prevent the liquid from climbing with the stem or adhering to the stem. Thus there will be no liquid on the stem to be weighed or to affect the accuracy of the balance.

While it is advantageous to employ a liquid with a long evaporation period, the level of the liquid is not critical. In the particular form of the invention herein shown, the upper calibrated float 40 merely rises or falls with slight changes in the liquid level. Additional liquid can be added as necessary. Note that the upper float 40, with its calibrated dial 41, floats freely at the surface of the liquid and is freely movable without perceptible friction. There is no true bearing connection between the cam 20 and the float 40, and no perceptible frictional loss. Since both floats are in the liquid there is a natural dash pot effect, and the pointer 44 and the calibration 41 reach an equilibrium within a very short period after a change of weight on the platform 33. Note also that the rib 36, extending around the float 19, limits the cross sectional area of the space through which the liquid passes as the float 19 rises or falls in the liquid body, and provides a dash pot effect.

In the variant form of Figure 5, the float 60 is provided with a bellows portion which may be adjusted by rotation of the screw 66. Thus the cubic contents of the float can be varied or set by the operator. This may be used to compensate for temperature changes, and may also be employed to compensate for tare weight when weighing articles in packages. A similar compensation for temperature may be automatically obtained by the form of Figure 6, in which the warping bar 75 responds to temperature changes and automatically increases or decreases the cubic contents of the float 70.

One advantage of my balance rests in the fact that its principle can be used without loss of accuracy, in balances for handling a wide range of weights. A balance weighing articles of a weight as great as 100 lbs. will be just as accurate as a balance handling weights of a few ounces. Accuracy is not affected by the size of the structure, which permits the employment of a simple and economical structure of great accuracy and sensitivity, for weighing even very substantial weights. I have thus provided a bulk weighing balance of the same order of sensitivity as the laboratory scales in use in the past.

As an example of the use of the balance the platform may carry a series of weights totalling the weight at which the balance is set. Assume that it is in balance at 8 oz. and the operator wishes to weigh a package of 8 oz. or less. He can remove a number of weights, or a weight total, equal to the weight of the package, and stop removing the weights when the system comes into balance.

Note that the interior of the float 19 is in communication with the outside air through the hollow stem 22. Barometric pressure will therefore not affect the float since the interior of the float is subjected to atmospheric pressure.

Note also that the balance does not have to be precisely level to weigh accurately. The liquid will seek its own level within the container 7 and the floats will conform to the liquid level unless the tilting is so great as to cause frictional contact. However, a substantial range of difference in level is permissible without causing any frictional binding.

Note that the loose linkage makes it immaterial whether the weight is centered on the platform 33 or not. At all times the center of gravity of the platform and the weight it carries, the point of attachment of the weight, the center of gravity of the float 19 and the center of buoyancy will all be in a single vertical line.

The delicacy of setting of the calibrated disc can be varied by varying the displacement and the contour of the cam 20 carried by the float 19.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

I claim:

1. In a hydraulic balance, a reservoir, a body of liquid therein, a master float entirely submerged in the liquid, a stem, the cross sectional area of which is many times less than that of the float, extending upwardly therefrom above the surface of the liquid, an indicator float at the surface of the liquid and means interposed between the floats to cause relative displacement thereof in the plane of the liquid surface in consonance with change in the depth of immersion of the master float, an indicator interposed between the floats to show such relative movement, means for supporting by the stem an object, the weight of which is to be determined, the floats, the stem, the weight supporting means and the indicator being normally out of contact with any part of and being free to move without interference in the reservoir.

2. In a hydraulic balance, a reservoir, a body of liquid therein, a master float entirely submerged in the liquid, a stem, the cross sectional area of which is many times less than that of the float, extending upwardly therefrom above the surface of the liquid, a rotatable indicator float at the surface of the liquid, means interposed between the master float and the indicator float to cause relative angular displacement of the master float and the indicator float consonant with change in depth of immersion of the master float, an indicator extending upwardly from the master float to the indicator float, the indicator float being graduated to show, with the indicator, the relative angular movement of the two floats, means for supporting by the stem an object the weight of which is to be determined, the floats, the stem, the weight supporting means and the indicator being normally out of contact with any part of and being free to move without interference in the reservoir.

3. In a hydraulic balance, a reservoir, a body of liquid therein, a master float entirely submerged in the liquid, a stem, the cross sectional area of which is many times less than that of the float, extending upwardly therefrom above the surface of the liquid, a rotatable indicator float at the surface of the liquid, means interposed between the master float and the indicator float to cause relative angular displacement of the master float and the indicator float consonant with change in depth of immersion of the master float, the periphery of one of the floats being graduated, an indicator controlled in position by the other float, along the graduation to indicate the angular relation between the two floats, means for supporting by the stem an object the weight of which is to be determined, the floats, the stem, the weight supporting means and the indicator being normally out of contact with any part of and being free to move without interference in the reservoir.

4. In a hydraulic balance, a reservoir, a body of liquid therein, a master float entirely submerged in the liquid, a stem, the cross sectional area of which is many times less than that of the float, extending upwardly therefrom above the surface of the liquid, an indicator float at the surface of the liquid and means interposed between the floats to cause relative displacement thereof in the plane of the liquid surface in consonance with change in the depth of immersion of the master float, an indicator interposed between the floats to show such relative movement, means for supporting by the stem an object, the weight of which is to be determined, the floats, the stem, the weight supporting means and the indicator being normally out of contact with any part of and being free to move without interference in the reservoir, and means operably connected to the master float, and manually controlled, for adjusting the volumetric capacity of the master float while all the elements of the balance are in operative relation.

5. In a hydraulic balance, a reservoir, a body of liquid therein, a master float entirely submerged in the liquid, a stem, the cross sectional area of which is many times less than that of the float, extending upwardly therefrom above the surface of the liquid, an indicator float at the surface of the liquid and means interposed between the floats to cause relative displacement thereof in the plane of the liquid surface in consonance with change in the depth of immersion of the master float, an indicator interposed between the floats to show such relative movement, means for supporting by the stem an object, the weight of which is to be determined, the floats, the stem, the weight supporting means and the indicator being normally out of contact with any part of and being free to move without interference in the reservoir, a free and unobstructed air passage between the interior of the master float and the air above the level of the fluid in the reservoir.

6. In a hydraulic balance, a reservoir, a body of liquid therein, a master float entirely submerged in the liquid, a stem, the cross sectional area of which is many times less than that of the float, extending upwardly therefrom above the surface of the liquid, an indicator float at the surface of the liquid and means interposed between the floats to cause relative displacement thereof in the plane of the liquid surface in consonance with change in the depth of immersion of the master float, an indicator interposed between the floats to show such relative movement, means for supporting by the stem an object, the weight of which is to be determined, the floats, the stem, the weight supporting means and the indicator being normally out of contact with any part of and being free to move without interference in the reservoir, and automatic means for varying the volumetric capacity of the master float in consonance with temperature changes, including a member, operatively connected to the master float, of a material having different thermal characteristics of expansion than the liquid in the reservoir.

LEON J. NOWAK, Jr.

(References on following page)

REFERENCES CITED

The following references are of record in the file of this patent:

UNITED STATES PATENTS

| Number | Name | Date |
|---|---|---|
| Re. 17,728 | Burningham et al. | July 15, 1930 |
| 1,199,687 | Gephardt | Sept. 26, 1916 |
| 2,212,586 | Chuy | Apr. 2, 1917 |

FOREIGN PATENTS

| Number | Country | Date |
|---|---|---|
| 74,648 | Switzerland | Apr. 2, 1917 |
| 291,895 | Great Britain | June 14, 1928 |